US012499683B1

(12) United States Patent
Thanikachalam et al.

(10) Patent No.: US 12,499,683 B1
(45) Date of Patent: Dec. 16, 2025

(54) SYSTEM AND METHOD FOR VERIFYING AN EVENT FROM A CAMERA WITH AN EVENT FROM A DEVICE PROXIMATE TO THE CAMERA

(71) Applicant: MOTOROLA SOLUTIONS, INC., Chicago, IL (US)

(72) Inventors: Balamurugan Murugamudali Thanikachalam, Georgetown (MY); Rexy Prakash Chacko, Gelugor (MY); Murali Kuyimbil, Penang (MY); Wei Yee Wong, Sungai Siput Utara (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/965,102

(22) Filed: Dec. 2, 2024

(51) Int. Cl.
    *G06V 20/40* (2022.01)
    *G06V 10/74* (2022.01)
    *G06V 20/52* (2022.01)
    *H04N 7/18* (2006.01)

(52) U.S. Cl.
    CPC ............ *G06V 20/44* (2022.01); *G06V 10/761* (2022.01); *G06V 20/52* (2022.01); *H04N 7/183* (2013.01)

(58) Field of Classification Search
    CPC ....... G06B 20/52; G06V 10/761; H04N 7/183
    See application file for complete search history.

(56) References Cited

U.S. PATENT DOCUMENTS

| 10,515,290 | B2  |    | 12/2019 | Wang et al. |                |
|------------|-----|----|---------|-------------|----------------|
| 11,532,334 | B2  |    | 12/2022 | Ross et al. |                |
| 11,704,889 | B2  | *  | 7/2023  | Lin         | ........ G06V 20/41 |
| 11,704,908 | B1  | *  | 7/2023  | Xu          | ........ G06V 40/172 |
|            |     |    |         |             | 382/181         |
| 11,817,130 | B2  |    | 11/2023 | Ross et al. |                |
| 11,895,439 | B2  |    | 2/2024  | Hodge et al.|                |
| 12,067,755 | B1  | *  | 8/2024  | Nan         | ..... G06F 3/04842 |
| 2016/0171852 | A1 | * | 6/2016  | Lin         | ........ G06V 20/52 |
|            |     |    |         |             | 382/103         |
| 2018/0173956 | A1 | * | 6/2018  | Edpalm      | ........ G06V 20/41 |
| 2023/0156162 | A1 | * | 5/2023  | Khadloya    | ........ G10L 25/51 |
|            |     |    |         |             | 348/158         |
| 2023/0245452 | A1 |    | 8/2023  | Tan et al.  |                |
| 2024/0071083 | A1 |    | 2/2024  | Ramanathan et al. |          |
| 2024/0119734 | A1 | * | 4/2024  | Aelmore     | ........ G06T 7/11 |

FOREIGN PATENT DOCUMENTS

EP  3323240 B1  4/2021

* cited by examiner

*Primary Examiner* — Tsion B Owens

(57) ABSTRACT

Techniques for verifying an event from a camera with an event from a device proximate to the camera are provided. Video footage from a camera is received. Trusted video analytics are used to identify an event occurring in the received video footage. At least one device proximate to the camera that uses trusted analytics to identify events is identified. The identified events are retrieved from the at least one device proximate to the camera. The identified event from the received video is compared to the identified events from the at least one device proximate to the camera. If the event matches at least one of the identified events, the identified event in the received video footage is verified. An indicator is inserted in the video footage from the camera at a timestamp when the event was identified, the indicator indicating the event is verified.

20 Claims, 5 Drawing Sheets

SYSTEM AND METHOD FOR VERIFYING AN EVENT FROM A CAMERA WITH AN EVENT FROM A DEVICE PROXIMATE TO THE CAMERA

BACKGROUND

The presence of cameras in today's society has become ubiquitous. It is quite likely that it is not possible to venture outside one's home without being captured by at least one camera. There are traffic cameras, retail surveillance cameras, doorbell cameras, etc. One particular type of camera that is becoming more prevalent every day is the Body Worn Camera (BWC) primarily worn by law enforcement officers (e.g. police, etc.). Although not limited to law enforcement, the primary users of BWCs are law enforcement personnel.

The use of BWCs has the ability to reduce, or even eliminate, disputes over what occurred in a situation, as the captured video has the potential to be able to record an event as it occurs. Although not perfect, BWC camera recordings are not prone to the subjectivity of a human trying to recollect what they perceived during an event. This ability of BWC recordings to provide objective evidence of what actually occurred during an event, at least from the perspective of the person equipped with the BWC, have made the recordings invaluable as evidence in proceedings, such as court proceedings.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
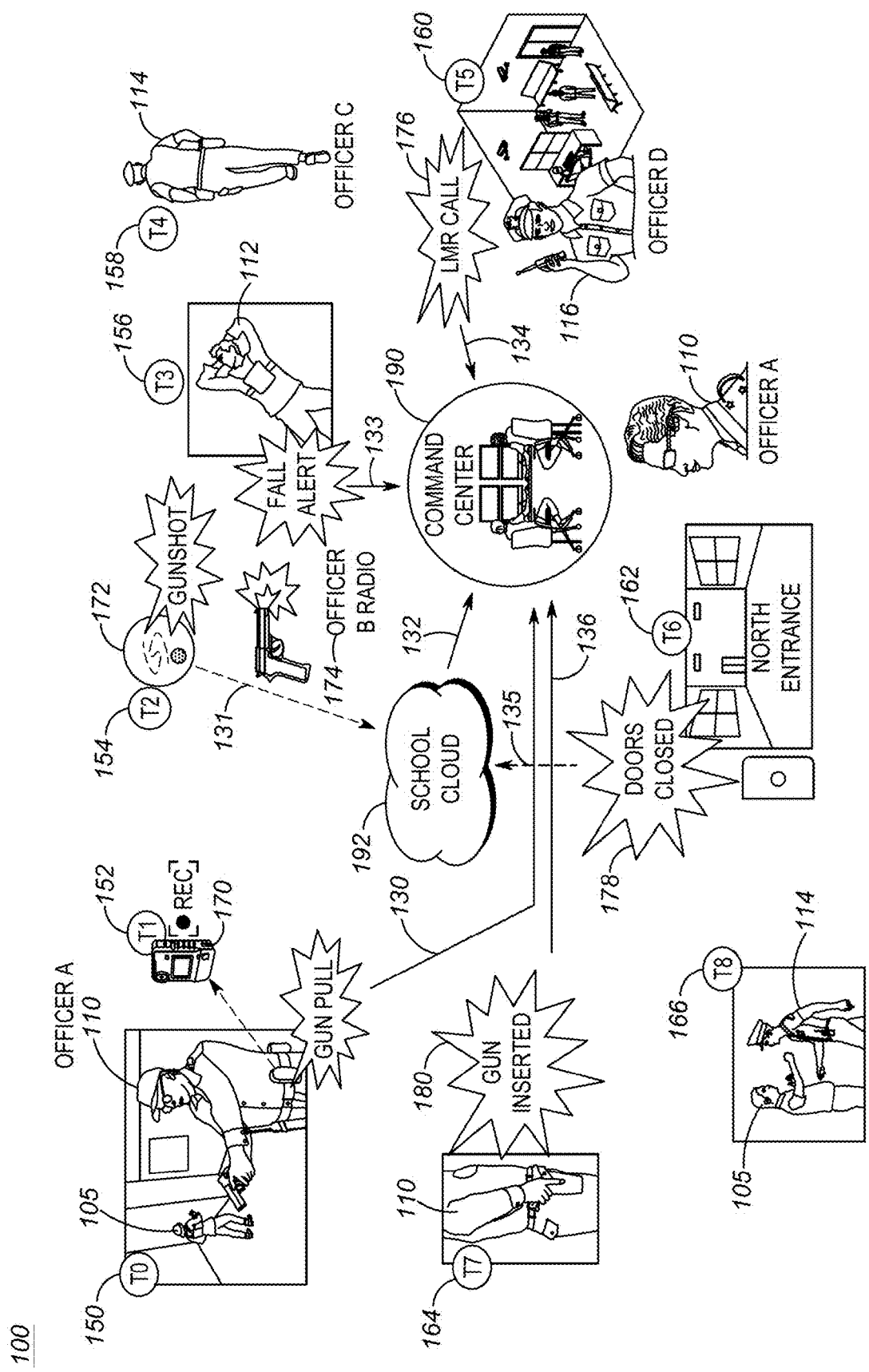
FIG. 1 is an example scenario of a BWC capturing events in an incident.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

At the same time that the presence of cameras is increasing, technologies used to manipulate captured video are also improving. For example, Generative Artificial Intelligence (Gen AI) models, such as DALL-E are able to take a text description and generate synthetic images and/or video. Gen AI models can also create what may be referred to as deepfakes, where AI can take existing video and modify it such that the video no longer represents what was originally captured. In many cases, the deepfakes are so convincing, it is virtually impossible for humans to distinguish video captured by the camera with video generated by Gen AI, or other such techniques.

A problem arises when video footage captured by a BWC is needed for evidentiary purposes. It is often very difficult to prove that the originally captured video has not been altered using Gen AI, or other techniques. One way of showing that the video has not been altered is using digital signatures. When a video is captured, it is digitally signed. Any subsequent alterations to the video will cause the digital signature to no longer match, indicating the video has been tampered with. Although this may be a solution in some cases, it does not prevent alteration of the video prior to it being signed. In other words, if a bad actor is able to alter the video prior to it being digitally signed, the technique cannot be used to detect alterations to the original video.

The techniques described herein solve this problem and others, individually and collectively. A video captured by a BWC is processed using trusted video analytics to identify events. For example, a police officer firing his gun may be an event detected in the video using trusted video analytics. There is a database of other devices (e.g. not the BWC) that include various forms of sensors (e.g. other cameras, sound sensors, chemical sensors, smoke sensors, etc.). The database may also include information related to other systems (e.g. radio communications systems, etc.). The database includes locations of the devices.

When an event is detected via the trusted video analytics, the database can be accessed to determine if there are any devices proximate (e.g. nearby, etc.) the location where the event occurred that are capable of verifying the event. For example, in the case of a gunshot event, there may be a sound sensor (e.g. gunshot detector, etc.) that was proximate to the BWC at the time the gunshot event was detected. The data provided by the sound sensor can be accessed to determine if the sound sensor detected a gunshot sound at the same time as the event was detected in the BWC video. If so, the gunshot event occurring in the BWC video is verified, because it has been confirmed to match the same event captured by a device other than the BWC. If there is no match, this indicates that the event captured in the BWC video is not verified, and could potentially be a result of the BWC video being altered.

A method is provided. The method includes receiving video footage from a camera. The method also includes using trusted video analytics to identify an event occurring in the received video footage. The method also includes identifying at least one device proximate to the camera that uses trusted analytics to identify events. The method also includes retrieving the identified events from the at least one device proximate to the camera. The method also includes comparing the identified event from the received video to the identified events from the at least one device proximate to the camera, wherein if the event matches at least one of the identified events from the at least one device proximate to the camera, the identified event in the received video footage is verified. The method also includes inserting an indicator in the video footage from the camera at a timestamp when the event was identified when the identified event is verified, the indicator indicating the event is verified.

In one aspect, the method includes determining, based on the comparing, that the event from the received video footage does not match the identified events from the at least one device proximate to the camera and inserting an indicator in the video footage from the camera at the timestamp when the event was identified, the indicator indicating the event is suspect.

In one aspect, the method includes using the trusted video analytics to identify a second event occurring in the received video footage, identifying at least one second device proximate to the camera that uses trusted analytics to identify events, retrieving the identified events from the at least one second device proximate to the camera, comparing the identified second event from the received video footage to the identified events from the at least one second device proximate to the camera, wherein if the second event matches at least one identified events from the at least one second device proximate to the camera, the identified second event in the received video footage is verified, and inserting a second indicator in the video footage from the camera at a timestamp when the second event was identified when the second event is verified, the second indicator indicating the second event is verified.

In one aspect, the method includes determining a timestamp of the at least one of the identified events from the at least one device proximate to the camera that matches the event identified in the received footage and changing the indicator to indicate the event is not verified when a difference between the timestamp and the timestamp of the at least one of the identified events from the at least one device proximate to the camera that matches the event identified in the received footage exceeds a threshold.

A system is provided. The system includes a processor and a memory coupled to the processor. The memory contains thereon a set of instructions that when executed by the processor cause the processor to receive video footage from a camera. The instructions on the memory also cause the processor to use trusted video analytics to identify an event occurring in the received video footage. The instructions on the memory also cause the processor to identify at least one device proximate to the camera that uses trusted analytics to identify events. The instructions on the memory also cause the processor to retrieve the identified events from the at least one device proximate to the camera. The instructions on the memory also cause the processor to compare the identified event from the received video to the identified events from the at least one device proximate to the camera, wherein if the event matches at least one of the identified events from the at least one device proximate to the camera, the identified event in the received video footage is verified. The instructions on the memory also cause the processor to insert an indicator in the video footage from the camera at a timestamp when the event was identified when the identified event is verified, the indicator indicating the event is verified.

In one aspect, the instructions on the memory also cause the processor to determine, based on the comparing, that the event from the received video footage does not match the identified events from the at least one device proximate to the camera and insert an indicator in the video footage from the camera at the timestamp when the event was identified, the indicator indicating the event is suspect.

In one aspect, the instructions on the memory also cause the processor to use the trusted video analytics to identify a second event occurring in the received video footage, identify at least one second device proximate to the camera that uses trusted analytics to identify events, retrieve the identified events from the at least one second device proximate to the camera, compare the identified second event from the received video footage to the identified events from the at least one second device proximate to the camera, wherein if the second event matches at least one identified events from the at least one second device proximate to the camera, the identified second event in the received video footage is verified, and insert a second indicator in the video footage from the camera at a timestamp when the second event was identified when the second event is verified, the second indicator indicating the second event is verified.

In one aspect, the instructions on the memory also cause the processor to determine a timestamp of the at least one of the identified events from the at least one device proximate to the camera that matches the event identified in the received footage and change the indicator to indicate the event is not verified when a difference between the timestamp and the timestamp of the at least one of the identified events from the at least one device proximate to the camera that matches the event identified in the received footage exceeds a threshold.

A non-transitory processor readable medium is provided. The medium contains a set of instructions thereon that when executed by a processor cause the processor to receive video footage from a camera. The instructions on the medium also cause the processor to use trusted video analytics to identify an event occurring in the received video footage. The instructions on the medium also cause the processor to identify at least one device proximate to the camera that uses trusted analytics to identify events. The instructions on the medium also cause the processor to retrieve the identified events from the at least one device proximate to the camera. The instructions on the medium also cause the processor to compare the identified event from the received video to the identified events from the at least one device proximate to the camera, wherein if the event matches at least one of the identified events from the at least one device proximate to the camera, the identified event in the received video footage is verified. The instructions on the medium also cause the processor to insert an indicator in the video footage from the camera at a timestamp when the event was identified when the identified event is verified, the indicator indicating the event is verified.

In one aspect, the instructions on the medium cause the processor to determine, based on the comparing, that the event from the received video footage does not match the identified events from the at least one device proximate to the camera and insert an indicator in the video footage from the camera at the timestamp when the event was identified, the indicator indicating the event is suspect.

In one aspect, the instructions on the medium cause the processor to use the trusted video analytics to identify a second event occurring in the received video footage, identify at least one second device proximate to the camera that uses trusted analytics to identify events, retrieve the identified events from the at least one second device proximate to the camera, compare the identified second event from the received video footage to the identified events from the at least one second device proximate to the camera, wherein if the second event matches at least one identified events from the at least one second device proximate to the camera, the identified second event in the received video footage is verified, and insert a second indicator in the video footage from the camera at a timestamp when the second event was identified when the second event is verified, the second indicator indicating the second event is verified.

In one aspect, the instructions on the medium cause the processor to determine a timestamp of the at least one of the identified events from the at least one device proximate to the camera that matches the event identified in the received footage and change the indicator to indicate the event is not verified when a difference between the timestamp and the timestamp of the at least one of the identified events from the at least one device proximate to the camera that matches the event identified in the received footage exceeds a threshold.

In one aspect, the indicator is encrypted and signed prior to being inserted. In one aspect, the at least one device is a non-visual sensor. In one aspect, the at least one device is an access control system.

Further advantages and features consistent with this disclosure will be set forth in the following detailed description, with reference to the figures.

FIG. 1 is an example scenario 100 of a BWC capturing events in an incident. In the example scenario depicted in FIG. 1, assume the setting is a smart school equipped with various sensors (e.g. access control sensors, sound sensors, vaping/smoking sensors, etc.). Assume that a suspicious person 105 is lurking about the school campus. The scenario depicted in FIG. 1 will be described as a time line with Tx indicating a timestamp where various events occur.

At time T0 150, the suspicious person 105 may have been detected. Police officer A 110 may be dispatched to the school to investigate. At time T1 152, police officer A may draw his gun. In many BWC camera deployments, an officer removing their gun from its holster automatically causes the BWC to begin recording, assuming it is not already recording. As such, at time T1, a BWC 170 associated with police officer A will begin recording. As will be described in further detail below, it is the recording from the BWC that will be analyzed in accordance with the techniques described herein.

In addition to triggering the activation of the BWC, when police officer A 110 pulls his gun, a holster sensor may be triggered to indicate that the officer has drawn his weapon. The indication from the holster sensor that the gun has been drawn is sent 130 to the command center 190. The indication may include the location of the officer as well as the time when the weapon was drawn. This information may be displayed on a map, such that a dispatcher can see that the officer may be in a dangerous situation that has required him to draw his weapon. Furthermore, the time and location of the weapon draw can be recorded in a database associated with the command center.

At time T2 154 there is the sound of a gunshot in the video footage captured by the BWC 170. The smart school itself may be equipped with sensors that can detect sounds, such as gunshots, as well as other sounds (e.g. fights, etc.) and other activities (e.g. smoking, vaping, etc.). The sensor 172 is a sensor that can detect sounds such as gunshots. The sensor may then send 131 an indication that a gunshot was detected to the school smart building system which is shown as the school cloud 192. In some implementations, the school cloud may also send 132 the indication of the gunshot to the command center 190 to also be stored there. As before, the timestamp and the location of the detected gunshot sound will be recorded.

At time T3 156 the BWC 170 captured video may show officer B 112 having fallen to the ground. Officer B may be equipped with a radio (e.g. walkie talkie, etc.) 174 that includes a "fall alert" feature that can detect when the user of the radio has fallen down. Such a feature is well known in the public safety field to ensure that if an officer is to become incapacitated (e.g. fell down because he was injured, etc.) an indication of the condition is sent 133 to the command center 190. Thus the command center is notified that officer B is down and will also be notified of the time and location of officer B when the fall alert condition occurred.

At time T4 158, the video from the BWC 170 may show that officer C 114 has arrived at the school and is shown drawing his gun. In this example, there is no detection that the officer C's gun was removed from its holster. As such, unlike when officer A drew his gun, there is no indication sent to the command center indicating officer C drew his gun from the holster. As will be explained in further detail below, this may be an indication that the video capturing officer C drawing his weapon may be generated rather than accurately depicting what has occurred.

At time T5 160 the BWC 170 captured video may show that officer A 110 has engaged in a radio conversation with officer D 116. For example, all officers may be equipped with Land Mobile Radio (LMR) radios (e.g. portable radios, mobile radios, walkie talkies, etc.) that allow for communication. The LMR system keeps track of the time of all communication 176, and in fact may actually maintain recordings of all communications. This information is sent 134 to the command center 190.

At time T6 162 the BWC 170 captured video may show that the doors to the north entrance of the school were closed 178. The smart school building includes an access control system that monitors the state of all doors in the building. When the north entrance doors are closed as shown in the BWC video, the indication that the doors were closed is sent to the school cloud 135. In this example, because a door closing is not necessarily of interest to public safety (unlike the gunshot at T2 154) the indication may not be sent to the command center.

At time T7 164 the BWC 170 captured video shows officer A 110 reinserting his gun in the holster. Officer A's holster sensor detects the insertion 180 and sends this indication 136 to the command center 190. As with all the other indications sent, the location and timestamp of the event is sent as well.

At time T8 166 the video from the BWC 170 may show that officer C 114 has drawn his gun and is threatening the suspect 105. In this example scenario, there is no indication from the holster sensor of officer C that his gun was drawn. As such, there is no indication sent to the command center 190 that corroborates the fact that officer C has drawn his gun and is threatening the suspect.

Figure 2:
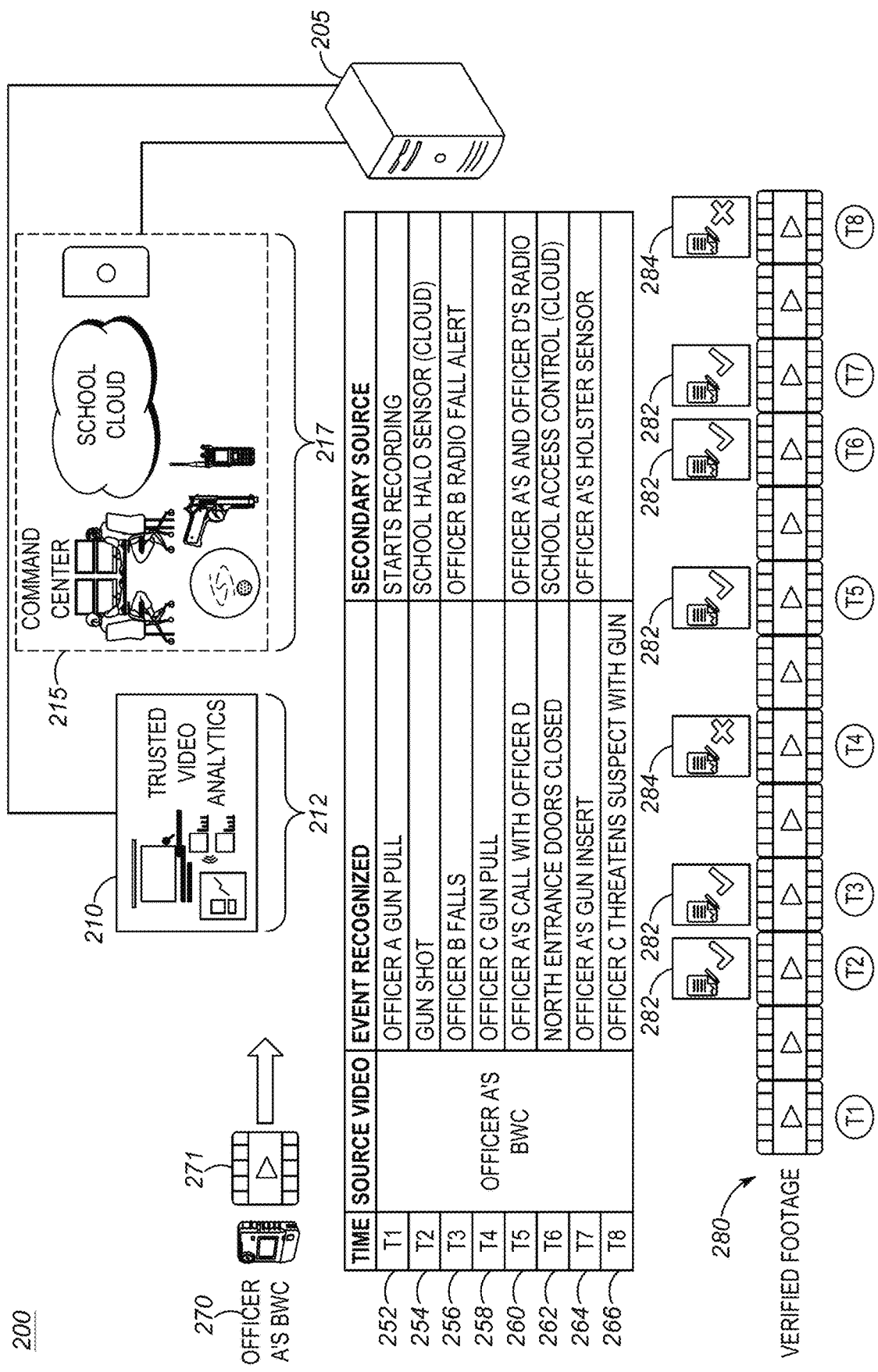
FIG. 2 is an example system for verifying the events captured from a camera with an event from a device proximate to the camera in accordance with the techniques described herein.

FIG. 2 is an example system 200 for verifying the events captured from a camera with an event from a device proximate to the camera in accordance with the techniques described herein. The system includes a device 205 that implements the techniques described herein. An example of a hardware device that may implement these techniques is described with respect to FIG. 5.

FIG. 2 depicts processing the video that was captured by an officer's BWC that was described with respect to the scenario described in FIG. 1. For ease of description, FIG.

2 will be described in terms of processing a captured video once the recording has been completed (e.g. once the scenario has concluded, etc.) and as such will be described in terms of the complete video being available. However, it should be understood that the techniques described herein are in no such way limited. In other implementations, events may be identified as they occur and those events verified by proximate devices when they are identified. In other words, events may be verified live, during video streaming.

In operation, video 271 from an officer's BWC 270 may be uploaded such that it is accessible by the device 205. In some cases, this may include uploading the video to device 205 directly. In other implementations, this may include uploading the video to a storage area that is accessible by the device (e.g. cloud storage, shared files system, etc.). What should be understood is that the video footage captured by the BWC is available to the device implementing the techniques described herein.

The device 205 may then be used to run trusted video analytics 210 on the received video. The trusted video analytics are video analytics that are used to extract events from video. These events can be extracted based on both visual and audio content of the captured video footage. The techniques described herein are not dependent on any particular trusted video analytic and are usable with any currently available or later developed video analytics. What should be understood is that the trusted video analytics are trusted to analyze video footage and correctly identify events. It should be understood that this should not be confused with verifying that the event actually occurred in real life. For example, deepfake techniques may be used to produce video footage of an event (e.g. a gunshot, etc.). The trusted video analytics may determine, upon analysis of the video, that the event occurred (e.g. the gunshot, etc.). This does not mean that the event was true. Verification of the event will be described in further detail below.

The trusted video analytic 210 may be used to analyze the video footage 271 to extract 212 events and the timestamps where those events occurred. As shown, at T1 252 the trusteed video analytics detected that the officer's gun was pulled (e.g. removed from its holster) and there was a gun drawn event. At time T2 254 the trusted video analytics determined that a gun shot was detected, resulting in a gun shot event. At time T3 256 the trusted video analytics determined that officer B has fallen, resulting in a man down event. At time T4 258 the trusted video analytics determines officer C pulls his gun, resulting in a gun drawn event. At time T5 260 the trusted video analytics detects a radio call between officers A and D, resulting in a communications event. At time T6 262 the trusted video analytics determines that the north entrance doors were closed, resulting in a door close event. At time T7 264 the trusted video analytics detects that officer C has reinserted his gun into the holster, resulting in a gun holstered event. At time T8 266 the trusted video analytic detects officer A threatens a suspect with a gun, resulting in an assault event.

As mentioned above, although the trusted video analytics has detected that these events were present in the received video 271, this does not mean the events actually occurred. The techniques described herein attempt to verify the identified events by comparing them to events identified by sources proximate to the BWC 270 at the times the event was detected. In order to do this, the device 205 may access proximate device data 215 to identify events 217 that were identified by the proximate devices.

FIG. 2 depicts proximate device data 215 as a single entity/data store. However, it should be understood that this is for ease of description only. In an actual implementation, the proximate device data may be distributed amongst many different systems. For example, in the scenario presented with respect to FIG. 1, there was a command center 190 that was able to detect events from sources proximate to the camera 270. There was also a school cloud 192 that was able to identify events from the school smart building. There could be any number of additional such data. For example, a city may have traffic and/or surveillance cameras. Private entities, such as businesses may have security cameras. Residences may have security cameras (e.g. doorbell cameras). Even individuals may be asked if they wish for audio/video data captured from their own personal devices are included. What should be understood is that the techniques described herein are not limited to any particular type or ownership of devices that can be used to verify an event.

As shown, at time T1 252, the video begins recording. This is not necessarily the type of event that needs to be verified, as the fact that recording started indicates that an event has occurred.

At time T2 254 the trusted video analytics identified a gun shot. The device 205 may then access the proximate device data 215 to determine if there are any devices that were proximate to the BWC 270 at that time that are able to verify the event. In this case, it is determined that there was a HALO™ sensor that was proximate to the BWC at the time of the gun shot event. A HALO™ sensor is a device that may be used to detect events such as gun shots (from sound), and people smoking/vaping. Such devices are often used in schools. Because the device is capable of identifying gun shots, the list of events identified by the proximate sensor is identified. If such an event is identified by the proximate device, it can be said that the event identified from the BWC has been verified. This is because a completely independent source has verified the event has occurred. If the event in the BWC was artificially generated, external devices would not have detected the same event.

At time T3 256 officer B falls. Many public safety radios (e.g. walkie talkies) are equipped with a fall alert feature that detects when an officer has fallen. Many of these systems are based on accelerometers within the device as well as other techniques (e.g. lack of movement, device in a horizontal rather than vertical alignment, etc.). This information can then be sent to the command center. In this particular case, the device 205 may access the proximate device data 215 to determine if there is a proximate device that can verify the event detected by the trusted video analytics. In this example, the proximate device could be officer B's radio. If the radio identified a fall alert occurrence at time T3, this means the event identified by the trusted video analytics has been verified.

At time T4 258 officer C pulls his gun. Once again, the device 205 may access the proximate device data 215 to determine if there is any device in proximity that could be used to verify the event. However, in this example, assume that no such data was found in the proximate device data. As such, the event detected by the trusted video analytics 210 at time T4 cannot be verified by an external source. This does not necessarily mean that the event detected by the trusted video analytics was fake, but rather means that it is unverified. The event may very well have occurred for real. However, because the event cannot be verified by an external source, extra scrutiny may be applied to the event.

At time T5 260 officer A and officer D have a radio conversation. The radio communications systems used in public safety keep records of all calls made (and actually keep recordings of the calls as well). Thus, the proximate device data 215 would include the records for the radio system indicating that a call was made, at that time, between officer A and D. As such, that event can be considered verified.

At time T6 262 the trusted video analytics identified an event that the North entrance doors were closed. Again, the device 205 may access the proximate device data 215 to identify any devices that might have identified the same event. In this example, the school may be equipped with a smart access control system that knows the open/close state of every door. If the school access control system detects a door close event occurred at time T6, this means the event identified by the trusted video analytics system can be considered verified.

At time T7 the trusted video analytics system detected that officer A's gun was reinserted into its holster. In this particular example, assume that the proximate device data 215 indicates a gun holstered event at time T7. As such, the event of officer A holstering his weapon at time T7 can be verified. However, this information could also be helpful in verifying other events. For example, at T1 252 an event was detected that officer A drew his weapon, however there was no corresponding event identified in the proximate device data 215. This could have been due to any number of reasons, including a faulty holster sensor, temporary communications disruption, etc. However, the fact that officer A has now holstered his weapon implies that at some point the weapon was drawn. Thus, even though the event at T1 could not be verified, the subsequent actions indicate that the event actually occurred, and was not a fake.

At time T8 266 the trusted video analytics identified an event where officer C threatens a suspect with a gun, thus assaulting the suspect. However, the device 205 may not have been able to find any device in the proximate device data 215 that is able to verify this event. For example, the gun draw sensor for officer C may not identify a gun draw event. Nearby surveillance cameras may not have identified an assault event. What should be understood is that when the event identified by the trusted video analytics cannot be verified by a proximate device, the event is considered unverified.

As shown in this example, the events that occurred at time T2, T3, T5, T6, and T7 were able to be verified by a device proximate to the BWC 270 at the time the event occurred. The events that occurred at T4 and T8 were not verified. As a result, verified footage 280 may be created. The verified footage may include visual indicators to indicate if the event identified at that timestamp has been verified or not. As shown, at timestamps T2, T3, T5, T6, and T7 the verified footage includes an indicator 282 indicating that the event depicted has been verified as having occurred by a device proximate to the camera. The verified indicator may also include a unique identity of the at least one device proximate to the camera that was used to verify the event. By doing so, it can be determined which device was the source of the verification, should that ever be questioned.

Likewise, at timestamps T4 and T8 an indicator 284 is inserted to indicate that the event depicted has not been verified. This is not a guarantee that the event did not occur, but should be used to indicate the event is suspect and should be given additional scrutiny.

Although FIG. 2 has been described in terms of devices that are fixed in location, it should be understood that the techniques described herein are in no such way limited. For example, a device proximate to the camera may be yet another mobile camera (e.g. dash camera of a vehicle, another officer's BWC, a camera on a public transportation vehicle, etc.). The proximate device may be any other type of mobile device capable of verifying events. What should be understood is that any device that is proximate to the camera at the time an event occurred may be utilized to verify the event.

In addition, FIG. 2 has been described in terms of proximate devices that are always active and generally operated by a public entity (e.g. public safety, schools, etc.) However, the techniques described herein are not limited to such devices. In some cases, the proximate device may be a privately owned device (e.g. smartphone, etc.). In such cases, a user may be prompted to allow access to their device in order to verify events. For example, a device may be detected proximate to the camera when an event occurs. A request may be sent to the device to begin capturing and sharing identified events in order to verify the event that is captured.

FIG. 2 has been described in terms of the proximate devices being stored in the proximate device data 215. In some implementations, proximate devices are constantly being identified as the BWC captures video footage. For example, the BWC itself may identify proximate devices. In other cases, proximate devices may be determined via other databases based on the location of the event. What should be understood is that proximate device data need not be a static list of proximate devices but may be continuously updated.

Figure 3:
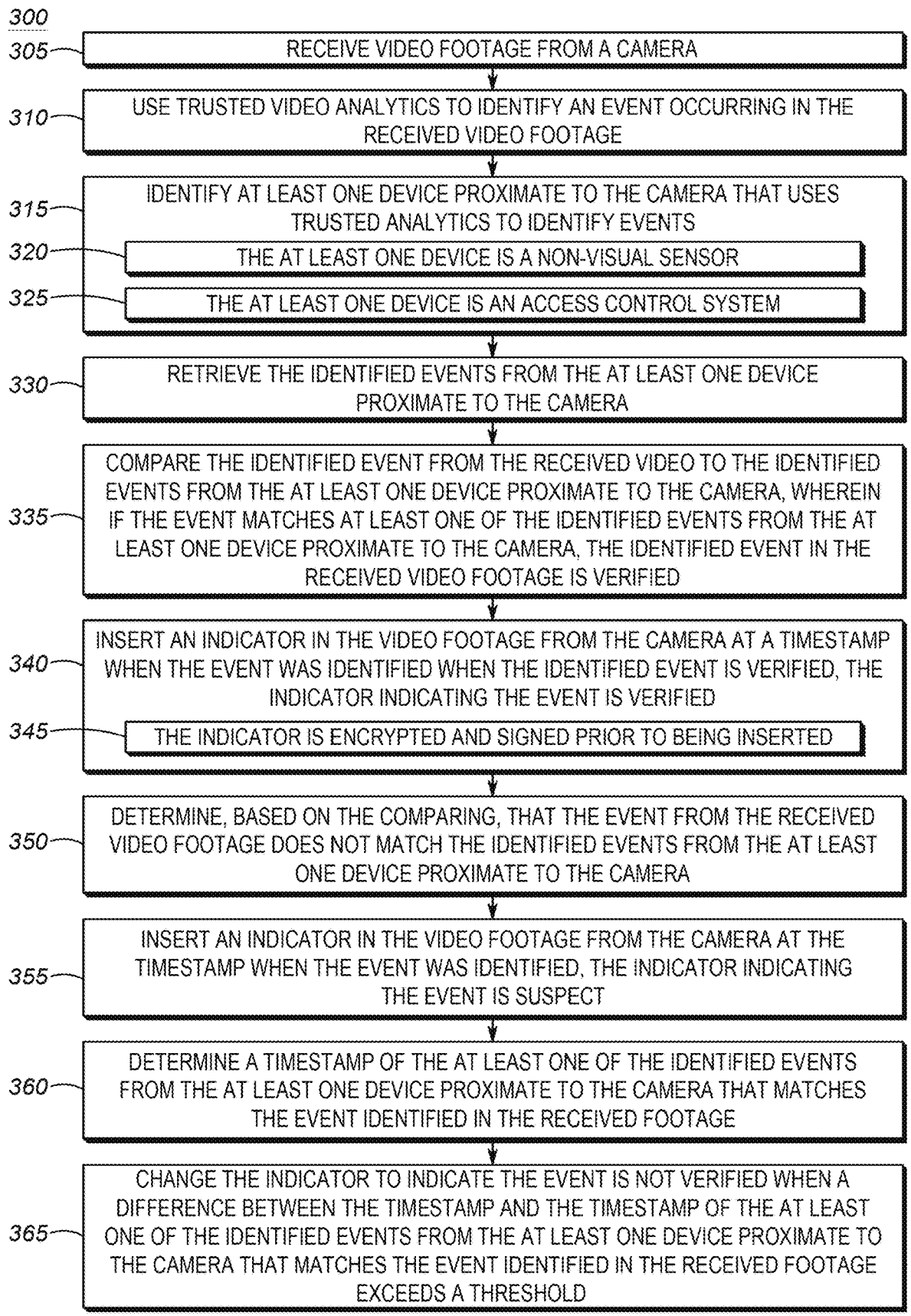
FIG. 3 is an example of a flow chart for verifying an event captured from a camera with an event from a device proximate to the camera in accordance with the techniques described herein.

FIG. 3 is an example of a flow chart 300 for verifying an event captured from a camera with an event from a device proximate to the camera in accordance with the techniques described herein. In block 305, video footage from a camera is received. This should be understood to mean that the video footage is purported to come from a camera without modification or alteration. That is to say the video footage has not been altered with any technique such as the use of Generative AI. It should be understood that the received video footage may, in fact, have been altered such that it no longer depicts what was originally captured.

In block 310, trusted video analytics are used to identify an event occurring in the received video footage. Trusted video analytics means that the analytics are trusted to analyze video footage and accurately detect events and/or objects within the video footage. For example, there may be a trusted video analytic to detect a gun being drawn in video footage. If the video footage depicts a gun being drawn, the analytic will accurately identify that event. Note, this does not mean that the gun being drawn ever actually happened in reality. It only means that in the video presented to the trusted video analytic, the gun draw event was detected.

It should be understood that there are many video analytics available to detect events occurring within a video. Analytics exist to detect aggressive behavior, gunshots, assaults, fall alert situations, unlawful acts (e.g. graffiti, etc.), crowd sentiment, etc. The techniques described herein are not limited to any currently available or later developed trusted video analytic. What should be understood is that the trusted video analytics are able to identify events occurring within the provided camera footage.

In block 315, at least one device proximate to the camera that uses trusted analytics to identify events is identified. As described above, the events detected by the trusted video analytics are verified using devices proximate (e.g. nearby, etc.) the camera that is purported to have captured the video footage. The definition of proximate may vary based on the type of device and the event that is being verified. For example, in the case where the device is another camera, a proximate device may be a camera with the same field of view as the camera purported to capture the video footage.

In the case of a proximate device that is a sound sensor, proximity may be determined by those devices that can hear the same sounds as the camera purported to capture the video footage. What should be understood is that proximate devices are those devices close enough to the camera that the data captured by those devices can be used to verify the identified events.

In block 320, the at least one device is a non-visual sensor. Several examples of non-visual sensors have been described above. For example, a sound sensor, a smoke sensor, a vaping/smoking sensor, a fire sensor, a gun draw sensor, a man-down sensor, etc. What should be understood is that the devices used to verify the event are not limited to other cameras, but can be any type of device that includes a sensor to identify events that can be matched with events identified by the trusted video analytics.

In block 325 the at least one device is an access control system. An access control system may be used to allow/deny access to an area. An access control system may keep track of people who have entered or exited an area. If an event captured in the video footage is a person drawing a gun, but the access control system shows that the person is not in the same place where the event was detected, then that particular event may be unverified.

In block 330, the identified events from the at least one device proximate to the camera are retrieved. In other words, for all the devices that are proximate to the camera, events that those devices themselves identified are retrieved. For example, if the device proximate to the camera is a gunshot sensor, all gunshot events detected by the device are retrieved. If the device proximate to the camera is another camera, all events captured by that camera are retrieved.

In block 335 the identified event from the received video is compared to the identified events from the at least one device proximate to the camera. If the event matches at least one of the identified events from the at least one device proximate to the camera, the identified event in the received video footage is verified. In other words, if the event in the video footage is confirmed by a device that is proximate to the camera, then the event in the video can be considered as verified. The event is verified because the event was identified using trusted video analytics, which means the event was properly identified in the supplied video footage, but was also corroborated by another device that was independent of the camera, but was in proximity to the camera.

In block 340 an indicator is inserted in the video footage from the camera at a timestamp when the event was identified when the identified event is verified. The indicator indicating the event is verified. The use of the verified indicator allows a viewer of the video footage to be provided a visual indicator that the portion of the video that is currently being viewed includes an event that was successfully corroborated with a device external to the device that captured the video. This allows the viewer to have greater confidence that the event being displayed actually occurred and was not the result of manipulation of the originally captured video.

In block 345, the indicator is encrypted and signed prior to being inserted. Just as above, if the video footage can be manipulated, the indicator has the same potential of being manipulated. By encrypting and signing the indicator, it makes it much more difficult to alter the video to indicate that an event has been verified. The reason this is true is that the verified video cannot be further modified (e.g. changing an unverified event into a verified event) because any such alteration would not have the proper keys to properly encrypt and sign the indicator.

In block 350, it is determined based on the comparing, that the event from the received video footage does not match the identified events from the at least one device proximate to the camera. In other words, this means that the event in the video footage could not be verified because it does not match any of the events identified from the devices proximate to the camera. It should be noted that this does not necessarily indicate that the identified event is the result of some type of manipulation of the original video footage, but rather that the event could not be independently verified from a device that was proximate to the camera. In some cases this may be simply because there were no capable devices proximate to the camera at the time of the event.

In block 355 an indicator is inserted in the video footage from the camera at the timestamp when the event was identified, the indicator indicating the event is suspect. If the event was unable to be verified, this means that there is the possibility the event was not real and was the result of tampering with the original video. An indicator that indicates the event is suspect allows the viewer to give greater scrutiny to the identified event. Again, this does not mean that the identified event is fraudulent, but rather indicates that additional scrutiny should be applied. Essentially, for unverified events, it should be a consideration that the event did not really occur, and may have been maliciously inserted.

In block 360 a timestamp of the at least one of the identified events from the at least one device proximate to the camera that matches the event identified in the received footage is determined. In other words, the event identified in the device proximate to the camera occurred at a given time. The time stamp indicates when the event was identified as occurring by the device proximate to the camera.

In block 365 the indicator is changed to indicate the event is not verified when a difference between the timestamp and the timestamp of the at least one of the identified events from the at least one device proximate to the camera that matches the event identified in the received footage exceeds a threshold. Even though an event is identified in a device proximate to the camera, if the timestamp of the events are not close enough (e.g. less than a threshold value, etc.) the event may no longer be considered verified. For example, the trusted video analytics may have also identified a gunshot at a particular time. A sound sensor proximate to the camera may also detected the gunshot, but at a later time. In some cases, this may be due to a misalignment in the clock's of the camera and the proximate device. If the time difference is small enough (e.g. below a threshold) this may be due to a small clock alignment issue, and the event may still be considered verified.

However if the difference exceeds a threshold, this may indicate that the video has been manipulated in some way to make it seem like the event occurred at an earlier/later time than it actually occurred. Because the time of event occurrence cannot be verified, the event can be indicated as not being verified and thus deserving of a greater level of scrutiny.

Figure 4:
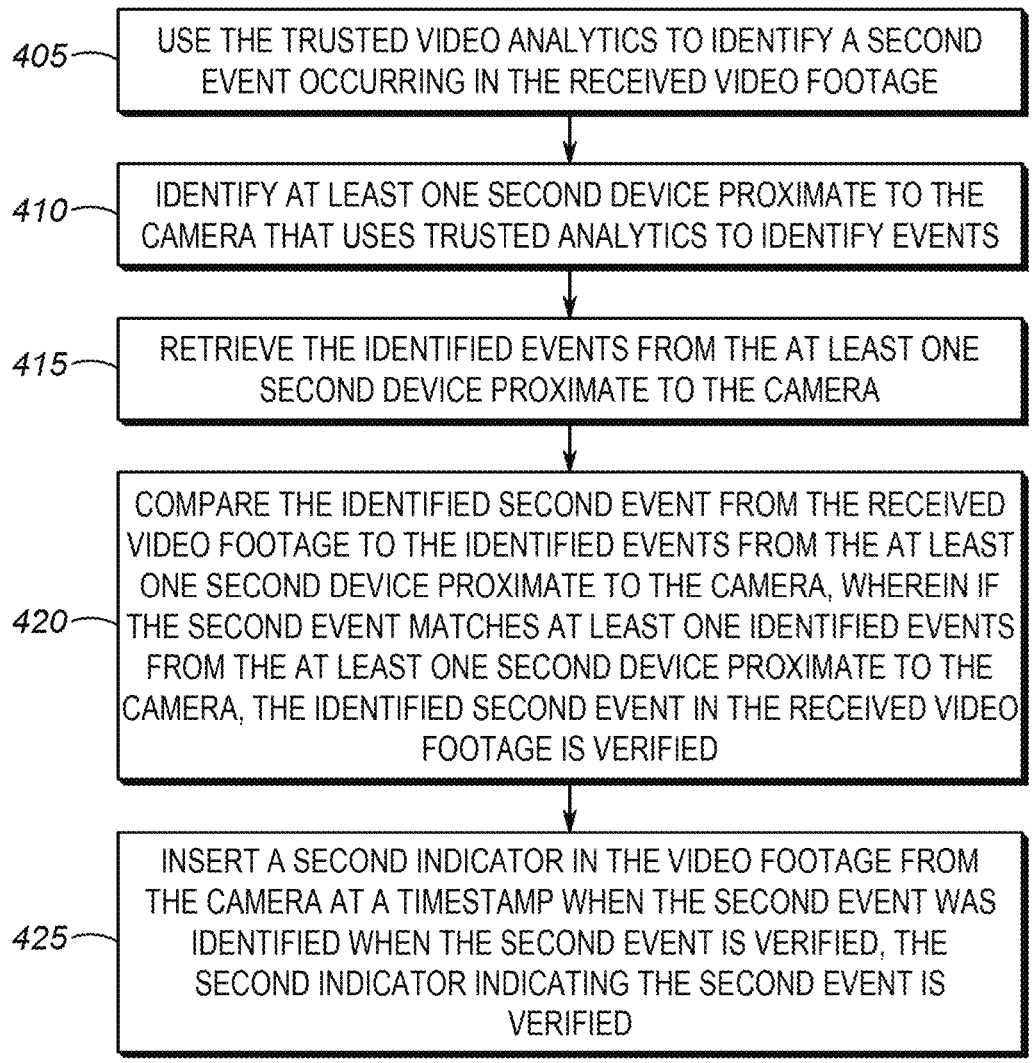
FIG. 4 is an example of a flow chart for verifying a second event using a second device proximate to the camera in accordance with the techniques described herein.

FIG. 4 is an example of a flow chart 400 for verifying a second event using a second device proximate to the camera in accordance with the techniques described herein. In block 405 the trusted video analytics are used to identify a second event occurring in the received video footage. Just as above, the trusted video analytics are used to identify an event detected in the video footage. The trusted video analytics identify events but do not necessarily confirm that those events were actually captured by the camera.

In block 410 at least one second device proximate to the camera that uses trusted analytics to identify events is identified. In other words, a second device that was proximate to the camera at the time the event was identified is identified. In some cases, the second device proximate to the camera may be the same as the first device proximate to the camera. For example, a gunshot may be detected as a first event with a sound sensor identified as the device proximate to the camera. At a later time, a second gunshot may be detected at the same location. In such a case, the second device proximate to the camera (e.g. the sound sensor, etc.) may be the same as the device proximate to the camera used to verify the first gunshot. In other cases, the second device proximate to the camera may be a different device than the device proximate to the camera used to verify the first event.

In block 415 the identified events from the at least one second device proximate to the camera are retrieved. Just as above, the second device proximate to the camera is able to identify events that occur within the proximity of the second device. If the camera is also within proximity to the second device, the second device can also verify events captured by the camera.

In block 420 the identified second event from the received video footage is compared to the identified events from the at least one second device proximate to the camera. If the second event matches at least one identified events from the at least one second device proximate to the camera, the identified second event in the received video footage is verified. In other words if the second device proximate to the camera is able to verify that the second event in the received video footage actually occurred, then the second event in the received video footage is considered verified. As explained above, a verified event is likely not to have been the result of tampering with the video footage because a second proximate to the camera has verified the event actually occurred.

In block 425 a second indicator is inserted in the video footage from the camera at a timestamp when the second event was identified when the second event is verified. The second indicator indicating the second event is verified. As explained above, an indicator is inserted into the video footage at the timestamp of the second event that provides a visual indication that the second event has been verified as having actually occurred by a second device that was proximate to the camera at the time the event was captured by the camera.

Figure 5:
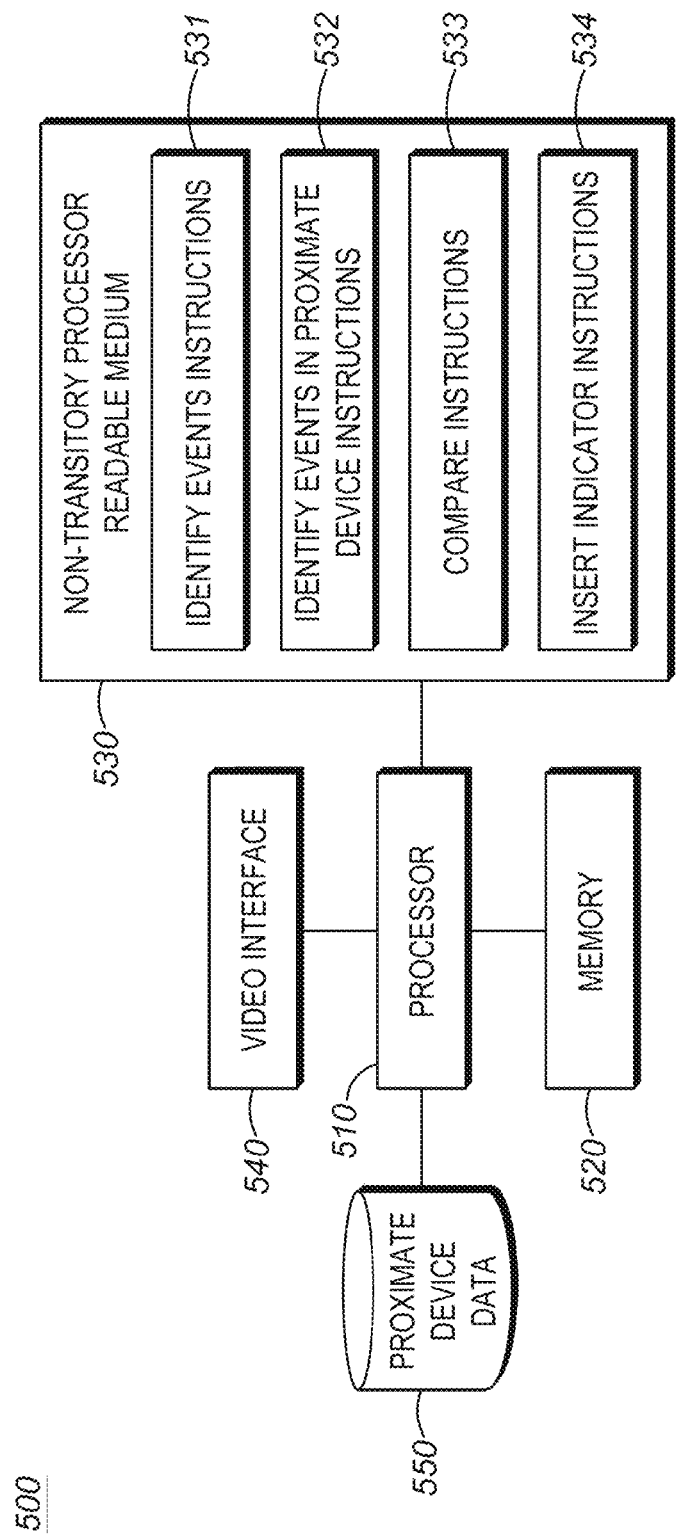
FIG. 5 is an example of a device that may implement the verifying an event captured from a camera with an event from a device proximate to the camera in accordance with the techniques described herein.

FIG. 5 is an example of a device 500 that may implement the verifying an event captured from a camera with an event from a device proximate to the camera in accordance with the techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. event detection, comparison, indicator insertion, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, video interface 540, and proximate device data 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include identify event instructions 531. The identify event instructions 531 may cause the processor to receive video footage and perform trusted video analytics on the received footage to identify events in the received video footage. For example, the processor may utilize the video interface to receive video footage that may have been captured with a BWC. The identify event instructions 531 are described throughout this description generally, including places such as the description of blocks 305, 310, and 405.

The medium 530 may include identify events in proximate device instructions 532. The identify events in proximate device instructions 532 may cause the processor to identify events captured by devices proximate to the camera that captured the received video footage at the time the event occurred. For example, the processor may access proximate device data 550 to collect information about devices proximate to the camera at the time of the event and use that data to verify events. The identify events in proximate device instructions 532 are described throughout this description generally, including places such as the description of blocks 315-330, 410, and 415.

The medium 530 may include compare instructions 533. The compare instructions 533 may cause the processor to compare the identified events for the received video footage to the identified events from proximate cameras. If the events in the received video footage match those in the proximate devices, the event is considered verified. The compare instructions 533 are described throughout this description generally, including places such as the description of blocks 335 and 420.

The medium 530 may include insert indicator instructions 534. The insert indicator instructions 534 may cause the processor to insert indicators into the received footage that indicates if the event identified in the received footage is verified or not. For example, the processor may use the video interface 540 to insert an indicator into the received video footage that provides a visual indication as to if the event captured is verified or not. Verified events may be given more credence than unverified events. The insert indicator instructions 534 are described throughout this description generally, including places such as the description of blocks 340-365 and 425.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement trusted video analytics to identify events, identify secondary sources that can verify the occurrence of the event, and insert a signed indicator into the video footage, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving video footage from a camera;
   using trusted video analytics to identify an event occurring in the received video footage;
   identifying at least one device proximate to the camera that uses trusted analytics to identify events;
   retrieving the identified events from the at least one device proximate to the camera;
   comparing the identified event from the received video to the identified events from the at least one device proximate to the camera, wherein if the event matches at least one of the identified events from the at least one device proximate to the camera, the identified event in the received video footage is verified; and
   inserting an indicator in the video footage from the camera at a timestamp when the event was identified when the identified event is verified, the indicator indicating the event is verified.

2. The method of claim 1 wherein the indicator is encrypted and signed prior to being inserted.

3. The method of claim 1 wherein the at least one device is a non-visual sensor.

4. The method of claim 1 wherein the at least one device is an access control system.

5. The method of claim 1 further comprising:
   determining, based on the comparing, that the event from the received video footage does not match the identified events from the at least one device proximate to the camera; and
   inserting an indicator in the video footage from the camera at the timestamp when the event was identified, the indicator indicating the event is suspect.

6. The method of claim 1 further comprising:
   using the trusted video analytics to identify a second event occurring in the received video footage;
   identifying at least one second device proximate to the camera that uses trusted analytics to identify events;
   retrieving the identified events from the at least one second device proximate to the camera;
   comparing the identified second event from the received video footage to the identified events from the at least one second device proximate to the camera, wherein if the second event matches at least one identified events from the at least one second device proximate to the camera, the identified second event in the received video footage is verified; and
   inserting a second indicator in the video footage from the camera at a timestamp when the second event was identified when the second event is verified, the second indicator indicating the second event is verified.

7. The method of claim 1 further comprising:
   determining a timestamp of the at least one of the identified events from the at least one device proximate to the camera that matches the event identified in the received footage; and
   changing the indicator to indicate the event is not verified when a difference between the timestamp and the timestamp of the at least one of the identified events from the at least one device proximate to the camera that matches the event identified in the received footage exceeds a threshold.

8. A system comprising:
   a processor; and
   a memory coupled to the processor, the memory containing a set of instructions thereon that when executed by the processor cause the processor to:
   receive video footage from a camera;
   use trusted video analytics to identify an event occurring in the received video footage;
   identify at least one device proximate to the camera that uses trusted analytics to identify events;
   retrieve the identified events from the at least one device proximate to the camera;
   compare the identified event from the received video to the identified events from the at least one device proximate to the camera, wherein if the event matches at least one of the identified events from the at least one device proximate to the camera, the identified event in the received video footage is verified; and
   insert an indicator in the video footage from the camera at a timestamp when the event was identified when the identified event is verified, the indicator indicating the event is verified.

9. The system of claim 8 wherein the indicator is encrypted and signed prior to being inserted.

10. The system of claim 8 wherein the at least one device is a non-visual sensor.

11. The system of claim 8 wherein the at least one device is an access control system.

12. The system of claim 8 further comprising instructions to:
    determine, based on the comparing, that the event from the received video footage does not match the identified events from the at least one device proximate to the camera; and
    insert an indicator in the video footage from the camera at the timestamp when the event was identified, the indicator indicating the event is suspect.

13. The system of claim 8 further comprising instructions to:
    use the trusted video analytics to identify a second event occurring in the received video footage;
    identify at least one second device proximate to the camera that uses trusted analytics to identify events;
    retrieve the identified events from the at least one second device proximate to the camera;
    compare the identified second event from the received video footage to the identified events from the at least one second device proximate to the camera, wherein if the second event matches at least one identified events from the at least one second device proximate to the camera, the identified second event in the received video footage is verified; and
    insert a second indicator in the video footage from the camera at a timestamp when the second event was identified when the second event is verified, the second indicator indicating the second event is verified.

14. The system of claim 8 further comprising instructions to:
    determine a timestamp of the at least one of the identified events from the at least one device proximate to the camera that matches the event identified in the received footage; and
    change the indicator to indicate the event is not verified when a difference between the timestamp and the timestamp of the at least one of the identified events from the at least one device proximate to the camera that matches the event identified in the received footage exceeds a threshold.

15. A non-transitory processor readable medium containing a set of instructions thereon that when executed by a processor cause the processor to:
    receive video footage from a camera;
    use trusted video analytics to identify an event occurring in the received video footage;
    identify at least one device proximate to the camera that uses trusted analytics to identify events;
    retrieve the identified events from the at least one device proximate to the camera;
    compare the identified event from the received video to the identified events from the at least one device proximate to the camera, wherein if the event matches at least one of the identified events from the at least one device proximate to the camera, the identified event in the received video footage is verified; and
    insert an indicator in the video footage from the camera at a timestamp when the event was identified when the identified event is verified, the indicator indicating the event is verified.

16. The medium of claim 15 wherein the indicator is encrypted and signed prior to being inserted.

17. The medium of claim 15 wherein the at least one device is a non-visual sensor.

18. The medium of claim 15 further comprising instructions to:
    determine, based on the comparing, that the event from the received video footage does not match the identified events from the at least one device proximate to the camera; and
    insert an indicator in the video footage from the camera at the timestamp when the event was identified, the indicator indicating the event is suspect.

19. The medium of claim 15 further comprising instructions to:
    use the trusted video analytics to identify a second event occurring in the received video footage;
    identify at least one second device proximate to the camera that uses trusted analytics to identify events;
    retrieve the identified events from the at least one second device proximate to the camera;
    compare the identified second event from the received video footage to the identified events from the at least one second device proximate to the camera, wherein if the second event matches at least one identified events from the at least one second device proximate to the camera, the identified second event in the received video footage is verified; and
    insert a second indicator in the video footage from the camera at a timestamp when the second event was identified when the second event is verified, the second indicator indicating the second event is verified.

20. The medium of claim 15 further comprising instructions to:
- determine a timestamp of the at least one of the identified events from the at least one device proximate to the camera that matches the event identified in the received footage; and
- change the indicator to indicate the event is not verified when a difference between the timestamp and the timestamp of the at least one of the identified events from the at least one device proximate to the camera that matches the event identified in the received footage exceeds a threshold.

* * * * *